US011860586B2

(12) United States Patent
Oshita

(10) Patent No.: US 11,860,586 B2
(45) **Date of Patent: *Jan. 2, 2024**

(54) ELECTRONIC DEVICE, TIMEPIECE, AND CONTROL METHOD

(71) Applicant: CASIO COMPUTER CO., LTD., Tokyo (JP)

(72) Inventor: Yuuki Oshita, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,661

(22) Filed: Nov. 10, 2022

(65) Prior Publication Data

US 2023/0067191 A1 Mar. 2, 2023

Related U.S. Application Data

(62) Division of application No. 16/808,289, filed on Mar. 3, 2020, now Pat. No. 11,561,514.

(30) Foreign Application Priority Data

Mar. 25, 2019 (JP) ................................ 2019-056105

(51) Int. Cl.

*G04G 21/04* (2013.01)
*G04F 10/00* (2006.01)
*G04B 47/06* (2006.01)

(52) U.S. Cl.

CPC ............. *G04G 21/04* (2013.01); *G04B 47/06* (2013.01); *G04F 10/00* (2013.01)

(58) Field of Classification Search

CPC .......... G04G 21/04; G04B 47/06; G04F 10/00
USPC .......................... 368/14; 455/456.1; 705/500
See application file for complete search history.

(56) References Cited

U.S. PATENT DOCUMENTS 9,304,207 B2 4/2016 Shingyoji
11,199,853 B1 12/2021 Afrouzi
(Continued)

FOREIGN PATENT DOCUMENTS

CN 101667009 A 3/2010
CN 104516005 A 4/2015
(Continued)

OTHER PUBLICATIONS

Chinese Office Action dated Mar. 8, 2021 in a counterpart Chinese patent application 202010187768.X. (Cited in the parent U.S. Appl. No. 16/808,289 and a machine translation (not reviewed for accuracy).
(Continued)

*Primary Examiner* — Prabodh M Dharia
(74) *Attorney, Agent, or Firm* — CHEN YOSHIMURA LLP

(57) ABSTRACT

An electronic device including: a positioning module that performs positioning by receiving radio waves from navigation satellites; a movement distance detection sensor that detects movement distance; and a processor that turns on power of the positioning module and, if positioning with the positioning module has not succeeded after a first prescribed period of time has elapsed, turns off power of the positioning module, wherein if the processor detects that the movement distance detected by the movement distance detection sensor starting from when the positioning module was turned off is greater than or equal to a prescribed distance, the processor turns on power of the positioning module.

14 Claims, 6 Drawing Sheets

(56) References Cited

U.S. PATENT DOCUMENTS

| | | | | |
|---|---|---|---|---|
| 2007/0182627 | A1* | 8/2007 | Ueno | G06F 1/3203 455/343.1 |
| 2010/0039974 | A1 | 2/2010 | Toshimizu et al. | |
| 2010/0054087 | A1 | 3/2010 | Matsuzaki | |
| 2013/0046463 | A1* | 2/2013 | Bengtson | G01C 21/165 701/500 |
| 2015/0091751 | A1 | 4/2015 | Sambongi | |
| 2015/0230048 | A1* | 8/2015 | Parameshwaran | G01C 21/20 455/456.1 |
| 2016/0306050 | A1* | 10/2016 | Shingyoji | G01S 19/425 |
| 2017/0228008 | A1 | 8/2017 | Yamashita | |

FOREIGN PATENT DOCUMENTS

| | | | |
|---|---|---|---|
| JP | H11-083529 | A | 3/1999 |
| JP | 2001-83227 | A | 3/2001 |
| JP | 2003-194910 | A | 7/2003 |
| JP | 2010-038712 | A | 2/2010 |
| JP | 2015-102515 | A | 6/2015 |
| JP | 2016-139897 | A | 8/2016 |

OTHER PUBLICATIONS

Japanese Office Action dated May 11, 2021 in a counterpart Japanese patent application No. 2019-056105. (Cited in the parent U.S. Appl. No. 16/808,289 and a machine translation (not reviewed for accuracy).

Chinese Office Action dated Jun. 23, 2021 in a counterpart Chinese patent application No. 202010187768.X. (Cited in the parent U.S. Appl. No. 16/808,289 and a machine translation (not reviewed for accuracy).

* cited by examiner

FIG. 6
FIG. 7
RUN
05. 014km
00:30’34”
Running
330
RUN
05. 014km
00:30’34”
Stopping
340

ELECTRONIC DEVICE, TIMEPIECE, AND CONTROL METHOD

BACKGROUND OF THE INVENTION

Technical Field

The technical field relates to an electronic device, a timepiece, and a control method.

Background Art

Detection of position (positioning) through use of Global Navigation Satellite Systems (GNSS) is becoming more common. In addition to automobile navigation systems, for example, wearable devices (mobile devices) which runners who run wear on the body and which keep running movement records (records such as movement distance, movement speed, and movement path) are also equipped with sensors (satellite radio wave sensors) that receive radio waves from navigation satellites.

In order to reduce power consumption, satellite radio wave sensors for mobile devices are powered ON when positioning is necessary and are powered OFF when unnecessary. In the example of a wearable device for runners, the satellite radio wave sensor is powered ON upon receiving an instruction from the runner (user) to prepare to take movement records.

The satellite radio wave sensor cannot begin positioning immediately after being powered ON (started up), and a prescribed amount of time is required to receive radio waves from three or more satellites and to calculate position, for example. Therefore, there are some cases in which the user inputs the instruction to prepare to take records indoors, where satellite radio waves cannot be received, rather than immediately before starting to actually take movement records.

In order to handle such cases, the mobile device starts up the satellite radio wave sensor, and, if no satellite radio waves can be received, repeatedly suspends the satellite radio wave sensor for a prescribed period of time. If no satellite radio waves can be received even after repeatedly starting up and suspending a prescribed number of times or for a prescribed period of time, the mobile device terminates recording preparation and leaves the satellite radio wave sensor suspended.

Moreover, Japanese Patent Application Laid-Open Publication No. 2001-83227 discloses a technology for determining, in an initial positioning performed after startup, whether the positioning result is normal or abnormal.

With the approach of repeatedly starting up and suspending until satellite radio waves can be received, even if the user moves and satellite radio waves become receivable, positioning does not begin while the satellite radio wave sensor is suspended, and as a result the start of acquisition of movement records may get delayed. Moreover, although Japanese Patent Application Laid-Open Publication No. 2001-83227 discloses a technology for determining whether a post-startup positioning result is normal or abnormal, there is no discussion of technologies for starting up the satellite radio wave sensor early once satellite radio waves become receivable and then beginning positioning accordingly.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, comprising: a positioning module that performs positioning of the electronic device by receiving radio waves from navigation satellites; a movement distance detection sensor that detects movement distance of the electronic device without using the radio waves from navigation satellites; and a processor configured to perform the following loop processes: (a) turning on power of the positioning module, (b) if positioning with the positioning module has not succeeded within a first prescribed period of time since the turning power on of the positioning module in process (a), turning off power of the positioning module, and (c) if the processor detects that the movement distance detected by the movement distance detection sensor starting from when the positioning module was turned off in process (b) is greater than or equal to a prescribed distance, returning to process (a) so as to turn on power of the positioning module again, wherein the processor is further configured to perform at least one of the following (d) and (e): (d) if the turning power off in process (b) and the turning power on in process (a) of the positioning module have been repeated a prescribed number of times through process (c) and if the positioning with the positioning module has not succeeded within the first prescribed period of time since the turning power on of the positioning module in process (a) that was performed most recently, the processor stops the processes from proceeding to process (c) and terminates supply of power to the positioning module, and (e) if a third prescribed period of time from when the positioning module was initially turned on in process (a) has elapsed while the turning power off in process (b) and the turning power on in process (a) of the positioning module have been repeatedly performed through process (c) and if the positioning with the positioning module has not succeeded within the first prescribed period of time since the turning power on of the positioning module in process (a) that was performed most recently, the processor stops the processes from proceeding to process (c) and terminates supply of power to the positioning module.

It is to be understood that both the foregoing general description and the following detailed description are exemplary and explanatory, and are intended to provide further explanation of the invention as claimed.

DETAILED DESCRIPTION OF EMBODIMENTS

Next, an electronic timepiece will be described as an electronic device which is an embodiment of the present invention. In addition to having a time display feature, the electronic timepiece displays movement (running) time and movement distance for the runner.

Figure 1:
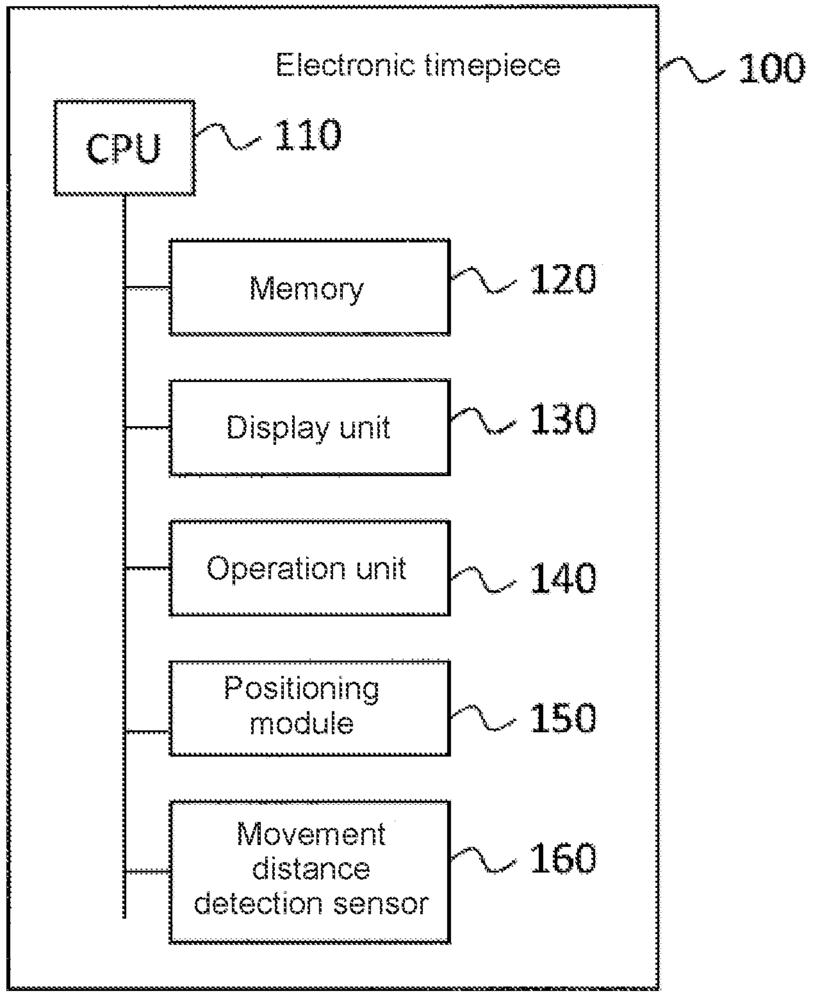
FIG. 1 is a functional block diagram of an electronic timepiece according to a present embodiment.

FIG. 1 is a functional block diagram of an electronic timepiece 100 according to the present embodiment. The electronic timepiece 100 includes a central processing unit (CPU) 110, a memory 120, a display unit 130, an operation unit 140, a positioning module 150, and a movement distance detection sensor 160.

The CPU 110 executes programs stored in the memory 120 to control the electronic timepiece 100. The memory 120 is constituted by a random-access memory (RAM), a read-only memory (ROM), a flash memory, or the like and stores programs for implementing the features of the electronic timepiece 100, programs for controlling the power of the positioning module 150, and any data necessary for program execution.

The display unit 130 displays the time, satellite radio wave reception status, movement time, and movement distance. The operation unit 140 includes a rotary switch 141 and buttons 142 to 145, which are illustrated in FIG. 2 and will be described later.

The positioning module 150 is a sensor which receives GNSS satellite radio waves and executes a positioning process based on information from the received radio waves to output the current position to the CPU 110. The movement distance detection sensor 160 is an acceleration sensor, for example, and detects and outputs movement distance to the CPU 110 by detecting locomotion and calculating step counts.

The electronic timepiece 100 further includes a battery, a communication module for communicating with other electronic devices, and various types of sensors such as a direction sensor, although none of these are explicitly illustrated in FIG. 1.

Figure 2:
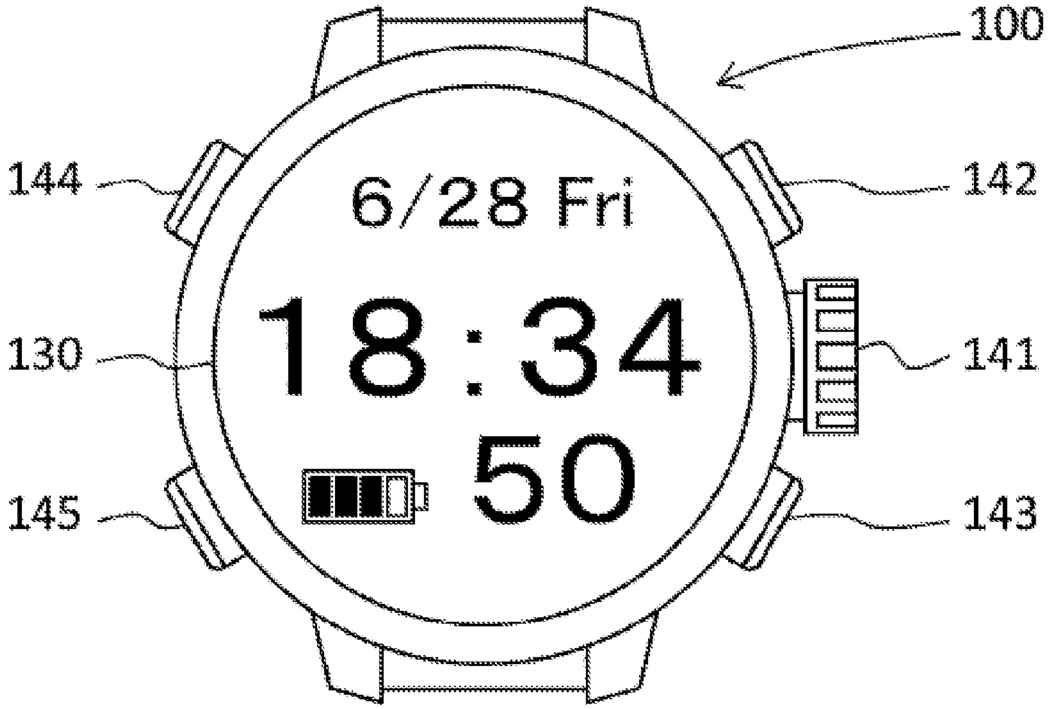
FIG. 2 illustrates the external appearance of the electronic timepiece according to the present embodiment.

FIG. 2 illustrates the external appearance of the electronic timepiece 100 according to the present embodiment. The electronic timepiece 100 is a wristwatch and includes the rotary switch 141 and the buttons 142 and 143 on the right side of the device as well as the buttons 144 and 145 on the left side of the device. The display unit 130 displays the date, the day of the week, the current time, and the remaining battery level.

Figure 3:
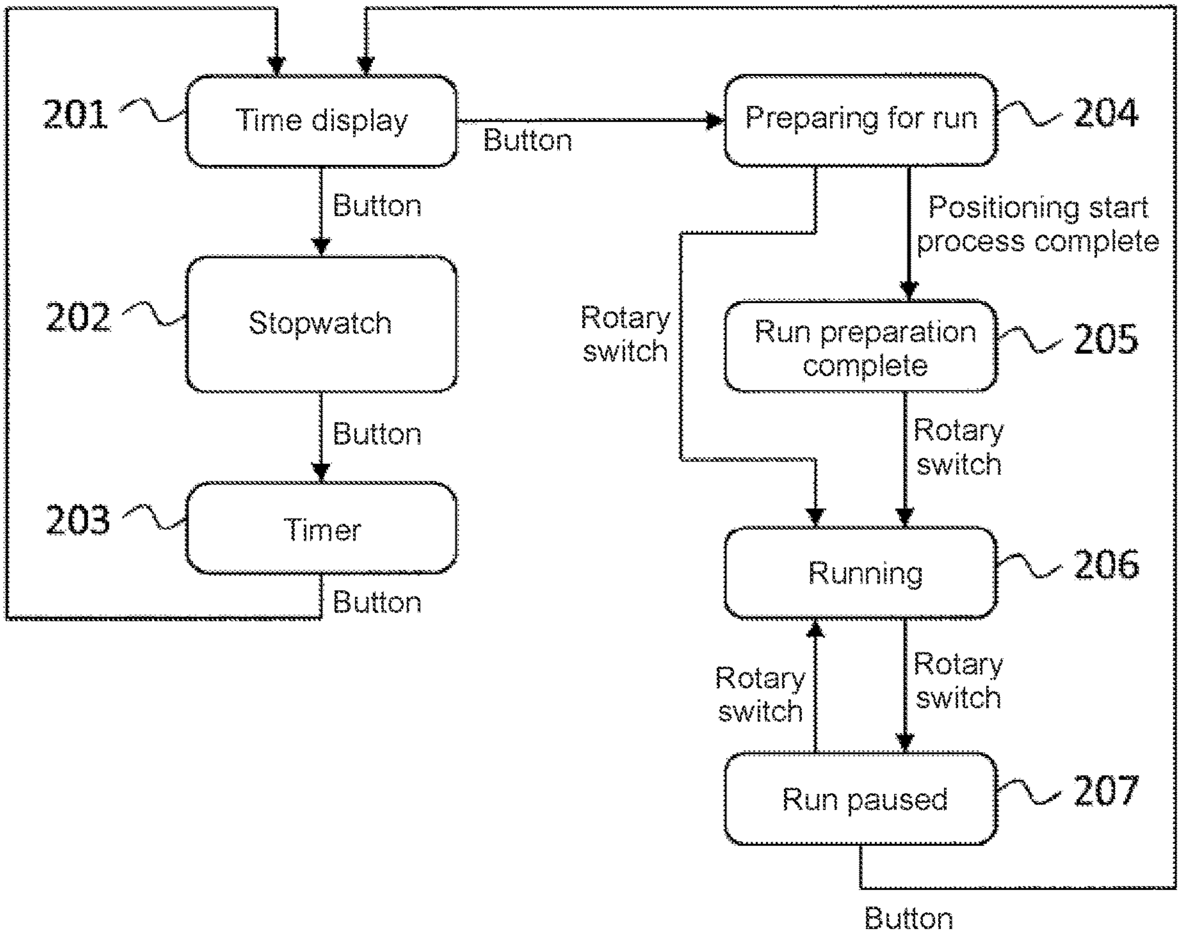
FIG. 3 is a state transition diagram for the electronic timepiece according to the present embodiment.

FIG. 3 is a state transition diagram for the electronic timepiece 100 according to the present embodiment. The states include a time display state 201, a stopwatch state 202, a timer state 203, a preparing for run state 204, a run preparation complete state 205, a running state 206, and a run paused state 207.

The time display state 201 is a state in which the electronic timepiece 100 displays the date and time (see FIG. 2).

The stopwatch state 202 is a state in which the electronic timepiece 100 functions as a stopwatch, where the button 142 becomes a start/stop button and the button 143 becomes a reset button.

The timer state 203 is a state in which the electronic timepiece functions as a timer, where rotating the rotary switch 141 sets the timer time and pressing the button 142 starts/stops/resumes the countdown.

Pressing the button 144 cycles through the time display state 201, the stopwatch state 202, and the timer state 203 in that order.

When the button 145 is pressed while in the time display state 201, the electronic timepiece 100 transitions to the preparing for run state 204 and displays a preparing for run screen 310 (see FIG. 4 (described later)) on the display unit 130. The preparing for run state 204 is a state for preparing to take movement (running) records and is the state in which a positioning start process (see FIG. 8 (described later)) is executed. Once the positioning start process in the preparing for run state 204 is complete, the device transitions to the run preparation complete state 205. Moreover, when the rotary switch 141 is depressed while in the preparing for run state 204, the device transitions to the running state 206.

Figure 4:
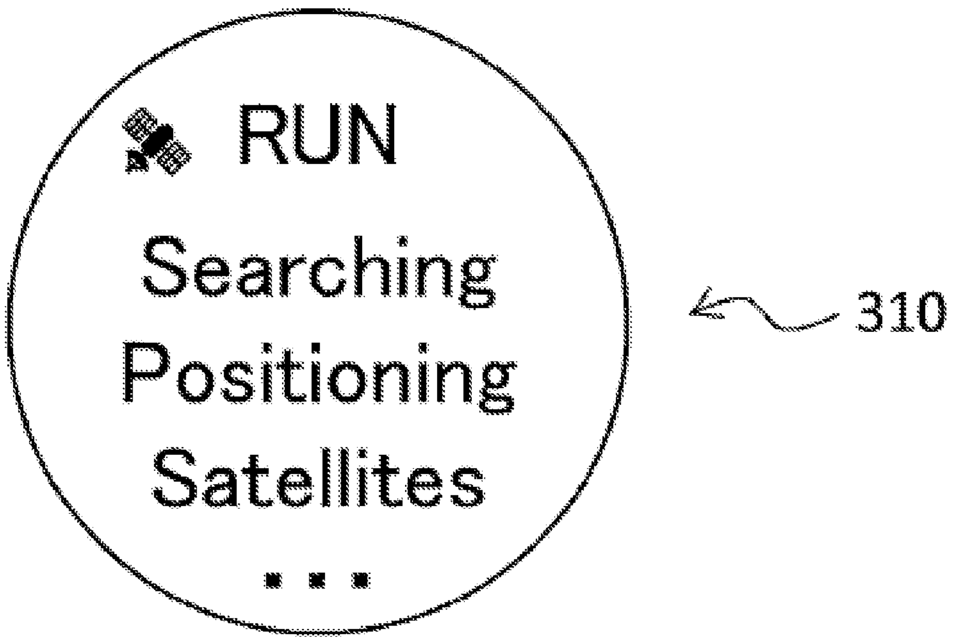
FIG. 4 illustrates a preparing for run screen that is displayed on a display unit of the electronic timepiece according to the present embodiment.

FIG. 4 illustrates the preparing for run screen 310 that is displayed on the display unit 130 of the electronic timepiece 100 according to the present embodiment. Here, a satellite icon is flashed in the upper left and "Searching Positioning Satellites . . . " is displayed, which allows the user to easily ascertain that the electronic timepiece 100 is in the preparing for run state 204.

Returning to FIG. 3, the run preparation complete state 205 is a state in which preparation for taking movement records is complete and records can begin to be taken, and the electronic timepiece 100 displays a run preparation complete screen 320 (see FIG. 5 (described later)) on the display unit 130. If the positioning start process succeeded (YES in step S103 in FIG. 8 (described later)), in the following processes the electronic timepiece 100 records movement on the basis of positional information output by the positioning module 150. Meanwhile, if the positioning start process failed (YES in step S104 in FIG. 8 (described later); also see S105), in the following processes the electronic timepiece 100 records movement on the basis of the movement distance output by the movement distance detection sensor 160. When the rotary switch 141 is depressed while in the run preparation complete state 205, the device transitions to the running state 206.

Figure 5:
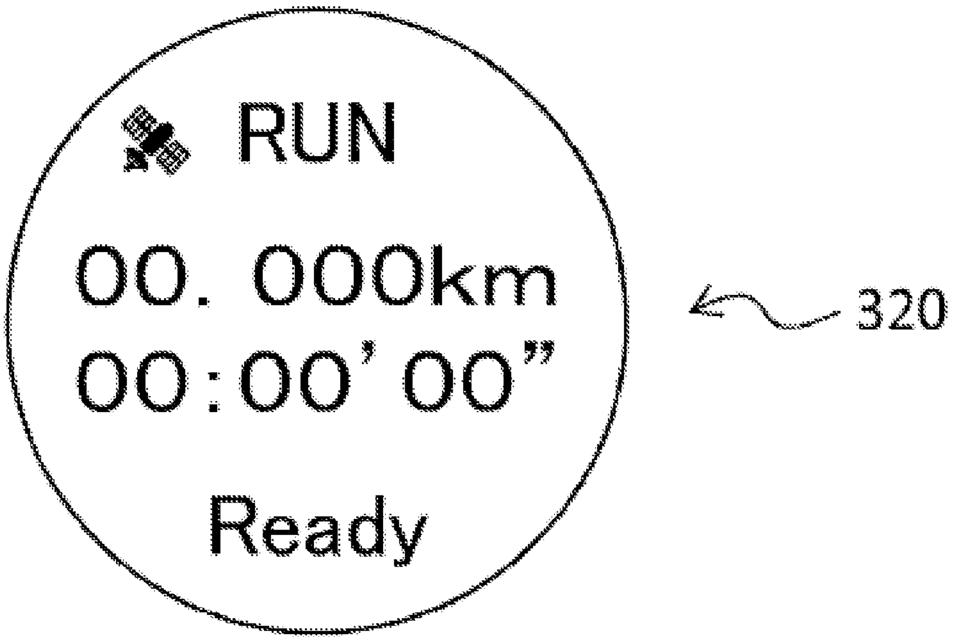
FIG. 5 illustrates a run preparation complete screen that is displayed on the display unit of the electronic timepiece according to the present embodiment.

FIG. 5 illustrates the run preparation complete screen 320 that is displayed on the display unit 130 of the electronic timepiece 100 according to the present embodiment. Near the bottom of the screen, "Ready" is displayed to allow the user to easily ascertain that the electronic timepiece 100 is in the run preparation complete state 205. Because this is a state prior to running (movement), the movement distance and movement time displayed in the middle of the screen are both zero. If the positioning start process succeeded and navigation satellite radio waves are being received, a satellite icon is displayed in the upper left. If the positioning start process failed and navigation satellite radio waves are not being received, no satellite icon is displayed in the upper left. FIG. 5 illustrates the run preparation complete screen 320 for a case in which navigation satellite radio waves are being received.

Returning to FIG. 3, the running state 206 is a state in which movement is recorded on the basis of the positional information output by the positioning module 150 or the movement distance output by the movement distance detection sensor 160, and a running screen 330 (see FIG. 6 (described later)) is displayed on the display unit 130. When the rotary switch 141 is depressed while in the running state 206, the device transitions to the run paused state 207.

Figure 6:
FIG. 6 illustrates a running screen that is displayed on the display unit of the electronic timepiece according to the present embodiment.

FIG. 6 illustrates the running screen 330 that is displayed on the display unit 130 of the electronic timepiece 100 according to the present embodiment. Near the bottom of the screen, "Running" is displayed to allow the user to easily ascertain that the electronic timepiece 100 is in the running state 206. Movement distance and movement time are displayed in the middle of the screen. If the positioning start process succeeded and navigation satellite radio waves are being received, a satellite icon is displayed in the upper left. If the positioning start process failed and navigation satellite radio waves are not being received, no satellite icon is displayed in the upper left. FIG. 6 illustrates the running screen 330 for a case in which navigation satellite radio waves are being received.

Returning to FIG. 3, the run paused state 207 is a state in which movement records are temporarily suspended, and a run paused screen 340 (see FIG. 7 (described later)) is displayed on the display unit 130. When the rotary switch 141 is depressed while in the run paused state 207, the device transitions to the running state 206. Moreover, when the button 145 is pressed while in the run paused state 207, the device returns to the time display state 201.

Figure 7:
FIG. 7 illustrates a run paused screen that is displayed on the display unit of the electronic timepiece according to the present embodiment.

FIG. 7 illustrates the run paused screen 340 that is displayed on the display unit 130 of the electronic timepiece 100 according to the present embodiment. Near the bottom of the screen, "Stopping" is displayed to allow the user to easily ascertain that the electronic timepiece 100 is in the run paused state 207. In the middle of the screen, the movement distance and movement time up to that point are displayed. If the positioning start process succeeded and navigation satellite radio waves are being received, a satellite icon is displayed in the upper left. If the positioning start process failed and navigation satellite radio waves are not being received, no satellite icon is displayed in the upper left. FIG. 7 illustrates the run paused screen 340 for a case in which navigation satellite radio waves are not being received.

Figure 8:
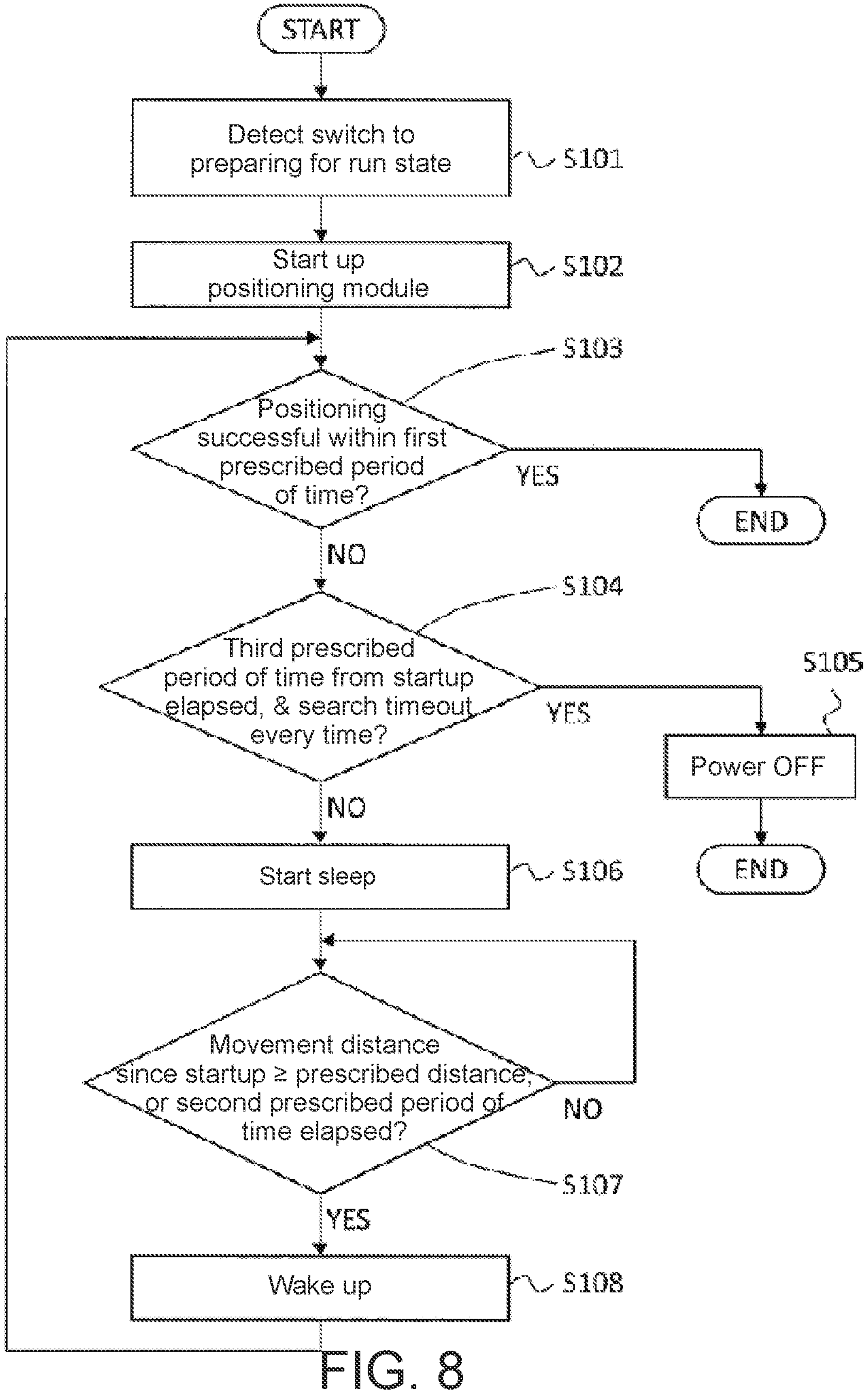
FIG. 8 is a flowchart of a positioning start process executed in a preparing for run state of the electronic timepiece according to the present embodiment.

FIG. 8 is a flowchart of the positioning start process executed in the preparing for run state 204 of the electronic timepiece according to the present embodiment. Here, the processes executed by the CPU 110 from when a run preparation instruction from the user is received until when navigation satellite radio waves are successfully received and positioning is successful or until when positioning does not succeed and fails will be described with reference to FIG. 8.

In step S101, the CPU 110 detects a switch to the preparing for run state 204. More specifically, the CPU 110 detects that the user pressed the button 145 while in the time display state 201 and transitions to the preparing for run state 204.

In step S102, the CPU 110 powers ON the positioning module 150 and starts up the positioning module 150. Then, the CPU 110 executes a looping process in which steps S103 to S108 are repeated.

In step S103, if the positioning module 150 did not succeed in positioning (NO in step S103), the CPU 110 proceeds to step S104, and if the positioning module 150 did succeed in positioning (YES in step S103), the CPU 110 ends the positioning start process. If the positioning start process is ended at this point, this means that radio waves from navigation satellites were successfully received and that positioning was successful, so the electronic timepiece 100 transitions to the run preparation complete state 205.

If positioning is not successful (search timeout), this means that positioning by utilizing satellite radio waves was not successful within a first prescribed period of time (a search timeout time) or that positioning was not successful because the number of satellites from which radio waves were received was insufficient. The search timeout time is two minutes, for example.

In step S104, if a third prescribed period of time (30 minutes, for example) from when the positioning module 150 was started up (see step S102) has elapsed and a search timeout occurred every time (YES in step S104), the CPU 110 proceeds to step S105. If the third prescribed period of time has not yet elapsed or a search timeout did not occur every time (NO in step S104), the CPU 110 proceeds to step S106.

Here, "search timeout" means that the positioning module 150 was unable to successfully achieve positioning within the search timeout time in step S103. "Every time" means each time that the process of step S103 to S108 was repeatedly executed. "Search timeout occurred every time" means that each time that steps S103 to S108 were repeated, the state in which the positioning module 150 was unable to achieve positioning continued for the duration of the search timeout time in step S103.

In step S105, the CPU 110 powers OFF the positioning module 150 and thereby ends the positioning start process. Unlike when the positioning start process is ended because positioning is successful in step S103 (YES in step S103), if the positioning start process is ended at this point, the electronic timepiece 100 transitions to the run preparation complete state 205 after having failed to receive radio waves from navigation satellites.

In step S106, the CPU 110 starts a positioning module 150 sleep (suspended) state.

In step S107, the CPU 110 calculates the movement distance from when the positioning module 150 was started up (see step S102), and if the user has moved by at least a prescribed distance (100 m, for example) or if at least a prescribed period of time (second prescribed period of time) from when the positioning module 150 went to sleep in step S106 has elapsed (YES in step S107), the CPU 110 proceeds to step S108. Otherwise (NO in step S107), step S107 is repeated until this happens (the CPU 110 calculates movement distance on the basis of the output from the movement distance detection sensor 160). For example, by referencing the output values of the acceleration sensor used as the movement distance detection sensor, the number of steps taken by the user since the positioning module 150 was started up is calculated. Moreover, step length is calculated from information about the user's body which is set in advance, and movement distance is calculated on the basis of the calculated step count and step length.

In step S108, the CPU 110 wakes up (re-activates) the positioning module 150.

When step S107 yields YES, the CPU 110 terminates the sleep state of positioning module 150 and wakes up (starts up) the positioning module 150 (see step S108) in order to resume positioning. If the user (and the electronic timepiece 100) have moved to a position in which satellite radio waves can be received, positioning succeeds (YES in step S103) and the positioning start process ends.

In this way, by resuming positioning by using a means other than the positioning module 150 to detect movement of at least a prescribed distance while the positioning module 150 is asleep, positioning can be started earlier than in conventional approaches in which movement is not detected and the positioning module 150 remains asleep.

Moreover, this makes it possible to shorten the time required to prepare for a run, thereby making it possible to reduce waiting time for the user.

The positioning start process in the embodiment described above (see FIG. 8) is a process that is executed during the preparing for run state 204. However, processes similar to this positioning start process for resuming positioning when satellite radio waves can no longer be received are not limited to being executed during the preparing for run state 204 and may also be executed during the run preparation complete state 205, the running state 206, or the run paused state 207.

Although in the positioning start process described above movement that occurs while the positioning module 150 is asleep is detected using the movement distance detection sensor 160, other approaches may also be used. For example, the electronic timepiece 100 may include a mobile phone radio wave sensor, and movement may be determined to have occurred when the signal strength of mobile phone radio waves has increased to at least a prescribed value. Alternatively, a short-range wireless communication receiving sensor may be included, and movement may be determined to have occurred when the signal strength of short-range wireless communications changes.

Furthermore, a movement direction detection sensor may be further included, and the device may be controlled such that, when calculating movement distance using the movement distance detection sensor 160, if the direction of movement is simultaneously detected and it can be determined that the user has moved by a prescribed distance in a prescribed direction, the sleep state of the positioning module 150 is terminated and positioned is resumed. Implementing this type of control makes it possible to reduce the likelihood of positioning being resumed when the user has moved a prescribed distance but has not moved significantly from the position at which the positioning module 150 was started up (such as when walking in circles within a fixed range while indoors, for example) and increases the likelihood that positioning will succeed. Moreover, this reduces the number of times that positioning is executed and thereby makes it possible to reduce power consumption.

In the positioning start process described above, the sleep step (see step S106) and wake-up step (see step S108) are repeated. The CPU 110 may power OFF the positioning module 150 instead of putting the positioning module 150 to sleep and may power ON the positioning module 150 instead of waking up the positioning module 150.

In the positioning start process described above, the wake-up step (see step S108) is performed when movement of at least a prescribed distance from startup (see step S102) has occurred (see YES in step S107). This prescribed distance is not limited to being a single distance and may be a plurality of distances. The prescribed distances may be 30 m, 50 m, 70 m, and 90 m, for example, and the process may proceed to step S108 and trigger the wake-up when movement of greater than or equal to any one of the distances among 30 m, 50 m, 70 m, and 90 m is detected.

Alternatively, rather than using movement distance from startup, the wake-up may be triggered when the movement distance from when the most recent sleep state started (see step S106) is greater than or equal to a prescribed distance.

Moreover, when the positioning start process is executed during the running state 206 or the run paused state 207 rather than during the preparing for run state 204, the positioning start process may be executed with a shorter sleep time because the running state 206 and the run paused state 207 offer a higher likelihood of successfully receiving satellite radio waves than the preparing for run state 204.

In step S104 of the positioning start process described above, if a third prescribed period of time from startup of the positioning module 150 has elapsed and a search timeout has occurred every time, the process proceeds to step S105 and then the positioning start process ends. The process may alternatively proceed to step S105 and then end the positioning start process when the start sleep step (see step S106) and the wake-up step (see step S108) have been repeated a prescribed number of times.

Although in the embodiment described above the electronic timepiece 100 records movement distance and movement time, position may be recorded and a movement history may be displayed, for example. Moreover, although in the embodiment above the present invention was described using the electronic timepiece 100 as an example, the present invention may be applied to an electronic device which does not have time features such as time display or a stopwatch and may also be applied to an electronic timepiece that has other features such as an alarm.

Although several embodiments of the present invention were described above, these embodiments are only examples and do not limit the technical scope of the present invention in any way. The present invention can take the form of various other embodiments, and various modifications such as removal or replacement of components can be made without departing from the spirit of the present invention. These embodiments and modifications thereof are included within the scope and spirit of the invention as described in the present specification and the like and are also included within the scope of the invention as defined in the claims, their equivalents, and the like.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic device, comprising:

a positioning module that performs positioning of the electronic device by receiving radio waves from navigation satellites;

a movement distance detection sensor that detects movement distance of the electronic device without using the radio waves from navigation satellites; and a processor configured to perform the following loop processes:

(a) turning on power of the positioning module, (b) if positioning with the positioning module has not succeeded within a first prescribed period of time since the turning power on of the positioning module in process (a), turning off power of the positioning module, and (c) if the processor detects that the movement distance detected by the movement distance detection sensor starting from when the positioning module was turned off in process (b) is greater than or equal to a prescribed distance, returning to process (a) so as to turn on power of the positioning module again, wherein the processor is further configured to perform at least one of the following (d) and (e):

(d) if the turning power off in process (b) and the turning power on in process (a) of the positioning module have been repeated a prescribed number of times through process (c) and if the positioning with the positioning module has not succeeded within the first prescribed period of time since the turning power on of the positioning module in process (a) that was performed most recently, the processor stops the processes from proceeding to process (c) and terminates supply of power to the positioning module, and (e) if a third prescribed period of time from when the positioning module was initially turned on in process (a) has elapsed while the turning power off in process (b) and the turning power on in process (a) of the positioning module have been repeatedly performed through process (c) and if the positioning with the positioning module has not succeeded within the first prescribed period of time since the turning power on of the positioning module in process (a) that was performed most recently, the processor stops the processes from proceeding to process (c) and terminates supply of power to the positioning module.

2. The electronic device according to claim 1, wherein in process (c), the processor additionally causes the process to be returned to process (a) so as to turn on power of the positioning module regardless of the moving distance detected by the movement distance detection sensor if a second prescribed period of time from when the positioning module was turned off in process (b) has elapsed.

3. The electronic device according to claim 2, wherein the movement distance detection sensor is an acceleration sensor, and wherein the processor calculates the movement distance from information output by the acceleration sensor.

4. A timepiece, comprising:

the electronic device, as set forth in claim 2; and a display unit that displays time, controlled by the processor in the electronic device.

5. The electronic device according to claim 1, wherein the movement distance detection sensor is an acceleration sensor, and wherein the processor calculates the movement distance from information output by the acceleration sensor.

6. A timepiece, comprising:

the electronic device, as set forth in claim 5; and a display unit that displays time, controlled by the processor in the electronic device.

7. The electronic device according to claim 1, wherein the processor performs (d) and does not perform (e).

8. A timepiece, comprising:

the electronic device, as set forth in claim 7; and a display unit that displays time, controlled by the processor in the electronic device.

9. The electronic device according to claim 1, the processor performs (e) and does not perform (d).

10. A timepiece, comprising:

the electronic device, as set forth in claim 9; and a display unit that displays time, controlled by the processor in the electronic device.

11. A timepiece, comprising:

the electronic device, as set forth in claim 1; and a display unit that displays time, controlled by the processor in the electronic device.

12. A method of controlling an electronic device performed by a processor in the electronic device, the electronic device including, in addition to the processor, a positioning module that performs positioning of the electronic device by receiving radio waves from navigation satellites; and a movement distance detection sensor that detects movement distance of the electronic device without using the radio waves from navigation satellites, the method comprising, via the processor:

(a) turning on power of the positioning module, (b) if positioning with the positioning module has not succeeded within a first prescribed period of time since the turning power on of the positioning module in process (a), turning off power of the positioning module, and (c) if the movement distance detected by the movement distance detection sensor starting from when the positioning module was turned off in process (b) is greater than or equal to a prescribed distance, returning to process (a) so as to turn on power of the positioning module again, wherein the method further comprises, via the processor, at least one of the following (d) and (e):

(d) if the turning power off in process (b) and the turning power on in process (a) of the positioning module have been repeated a prescribed number of times through process (c) and if the positioning with the positioning module has not succeeded within the first prescribed period of time since the turning power on of the positioning module in process (a) that was performed most recently, stopping the processes from proceeding to process (c) and terminating supply of power to the positioning module, and (e) if a third prescribed period of time from when the positioning module was initially turned on in process (a) has elapsed while the turning power off in process (b) and the turning power on in process (a) of the positioning module have been repeatedly performed through process (c) and if the positioning with the positioning module has not succeeded within the first prescribed period of time since the turning power on of the positioning module in process (a) that was performed most recently, stopping the processes from proceeding to process (c) and terminating supply of power to the positioning module.

13. The method according to claim 12, wherein the method includes (d), and does not include (e).

14. The method according to claim 12, wherein the method includes (e), and does not include (d).

* * * * *